United States Patent
Martin (10) Patent No.: US 10,831,334 B2
(45) Date of Patent: Nov. 10, 2020

(54) TELEPORTATION LINKS FOR MIXED REALITY ENVIRONMENTS

(71) Applicant: tagSpace Pty Ltd, Sydney (AU)

(72) Inventor: Paul Simon Martin, Sydney (AU)

(73) Assignee: Tagspace Pty Ltd, Sydney (AU)

( * ) Notice: Subject to any disclaimer, the term of this patent is extended or adjusted under 35 U.S.C. 154(b) by 0 days.

(21) Appl. No.: 15/683,651

(22) Filed: Aug. 22, 2017

(65) Prior Publication Data

US 2018/0059902 A1 Mar. 1, 2018

Related U.S. Application Data

(60) Provisional application No. 62/380,308, filed on Aug. 26, 2016.

(51) Int. Cl.
| | |
|---|---|
| *G06F 3/0481* | (2013.01) |
| *G06F 3/01* | (2006.01) |
| *G06K 9/00* | (2006.01) |
| *H04W 4/021* | (2018.01) |

(52) U.S. Cl.
CPC .......... *G06F 3/04815* (2013.01); *G06F 3/011* (2013.01); *G06K 9/00671* (2013.01); *H04W 4/021* (2013.01)

(58) Field of Classification Search
CPC .................................................. G06T 19/006
See application file for complete search history.

(56) References Cited

U.S. PATENT DOCUMENTS

| | | | |
|---|---|---|---|
| 8,238,671 B1 | 8/2012 | Babenko et al. | |
| 8,649,803 B1* | 2/2014 | Hamill | G06Q 30/0209 |
| | | | 455/456.3 |
| 9,298,283 B1* | 3/2016 | Lin | G06F 3/0346 |
| 9,563,723 B1* | 2/2017 | Breed | G06F 30/20 |
| 2009/0215427 A1 | 8/2009 | Hawkins | |
| 2010/0023878 A1 | 1/2010 | Douris et al. | |
| 2011/0055135 A1* | 3/2011 | Dawson | G06Q 30/02 |
| | | | 706/47 |
| 2011/0279445 A1 | 11/2011 | Murphy et al. | |

(Continued)

FOREIGN PATENT DOCUMENTS

| | | |
|---|---|---|
| WO | WO2017201568 A1 | 11/2017 |
| WO | WO2017201569 A1 | 11/2017 |

(Continued)

OTHER PUBLICATIONS

"International Search Report" and "Written Opinion of the International Searching Authority," Patent Cooperation Treaty Application No. PCT/AU2017/050759, dated Oct. 24, 2017, 16 pages.

(Continued)

*Primary Examiner* — Phi Hoang
(74) *Attorney, Agent, or Firm* — Fenwick & West LLP (57) ABSTRACT

Provided herein are exemplary methods for teleportation between two visual environments, including establishing a data structure for each visual environment, establishing logic for switching between each of the data structures, establishing an interactive graphical user interface communicatively coupled to each of the data structures and to the logic, and the interactive graphical user interface rendering a visual depiction of each of the visual environments.

20 Claims, 7 Drawing Sheets

(56) References Cited

U.S. PATENT DOCUMENTS

| | | |
|---|---|---|
| 2011/0279478 A1 | 11/2011 | Bitra |
| 2012/0086728 A1 | 4/2012 | McArdle et al. |
| 2012/0176516 A1 | 7/2012 | Elmekies |
| 2012/0242798 A1 | 9/2012 | McArdle et al. |
| 2013/0016123 A1 | 1/2013 | Skarulis |
| 2013/0031142 A1* | 1/2013 | Wester .................... G06F 9/451 707/802 |
| 2013/0155181 A1 | 6/2013 | Williams et al. |
| 2013/0293585 A1 | 11/2013 | Sudou |
| 2013/0325394 A1 | 12/2013 | Yuen et al. |
| 2014/0055491 A1 | 2/2014 | Malamud et al. |
| 2015/0124106 A1 | 5/2015 | Tomita |
| 2015/0206351 A1* | 7/2015 | Abercrombie ...... G06F 3/04815 345/419 |
| 2015/0235610 A1* | 8/2015 | Miller .................... G09G 5/006 345/633 |
| 2015/0254905 A1 | 9/2015 | Ramsby et al. |
| 2015/0332387 A1* | 11/2015 | Stacey ............... G06Q 30/0207 705/27.2 |
| 2015/0379772 A1 | 12/2015 | Hoffman |
| 2016/0133230 A1 | 5/2016 | Daniels et al. |
| 2017/0185261 A1* | 6/2017 | Perez .................. G06F 3/04815 |
| 2017/0316639 A1* | 11/2017 | Lyons ................. G07F 17/3211 |
| 2017/0337744 A1 | 11/2017 | Martin |
| 2017/0337745 A1 | 11/2017 | Martin |
| 2018/0033208 A1 | 2/2018 | Martin |
| 2018/0075591 A1 | 3/2018 | Du et al. |

FOREIGN PATENT DOCUMENTS

| | | |
|---|---|---|
| WO | WO2018018072 A1 | 2/2018 |
| WO | WO2018035564 A1 | 3/2018 |

OTHER PUBLICATIONS

"International Search Report" and "Written Opinion of the International Searching Authority," Patent Cooperation Treaty Application No. PCT/AU2017/050895, dated Nov. 28, 2017, 10 pages.

"International Search Report" and "Written Opinion of the International Searching Authority," Patent Cooperation Treaty Application No. PCT/AU2017/050473, dated Jul. 21, 2017, 14 pages.

"International Search Report" and "Written Opinion of the International Searching Authority," Patent Cooperation Treaty Application No. PCT/AU2017/050474, dated Aug. 23, 2017, 22 pages.

Martin, Paul Simon, "Media Tags—Location-Anchored Digital Media for Augmented Reality and Virtual Reality Environments", U.S. Appl. No. 15/600,446, filed May 19, 2017, Specification, Claims, Abstract, and Drawings, 69 pages.

Martin, Paul Simon, "TeleLocation: Location Sharing for Users in Augmented and Virtual Reality Environments", U.S. Appl. No. 15/656,956, filed Jul. 21, 2017, Specification, Claims, Abstract, and Drawings, 45 pages.

Martin, Paul Simon, "Fine-Grain Placement and Viewing of Virtual Objects in Wide-Area Augmented Reality Environments", U.S. Appl. No. 15/600,446, filed May 19, 2017, Specification, Claims, Abstract, and Drawings, 57 pages.

Martin, Paul Simon, "Fine-Grain Placement and Viewing of Virtual Objects in Wide-Area Augmented Reality Environments", U.S. Appl. No. 62/340,118, filed May 23, 2016, Specification, Claims, and Drawings, 16 pages.

"Geographic coordinate system", Wikipedia [online], [retrieved on Sep. 13, 2017], Retrieved from the Internet: <https://en.wikipedia.org/wiki/Geographic_coordinate_system>, 10 pages.

"ECEF", Wikipedia [online], [retrieved on Sep. 13, 2017], Retrieved from the Internet: <https://en.wikipedia.org/wiki/ECEF>, 2 pages.

"Axes conventions", Wikipedia [online], [retrieved on Sep. 13, 2017], Retrieved from the Internet: <https://en.wikipedia.org/wiki/Axes_conventions>, 5 pages.

"EGM96", Wikipedia [online], [retrieved on Sep. 13, 2017], Retrieved from the Internet: <https://en.wikipedia.org/wiki/EGM96>, 3 pages.

* cited by examiner

TELEPORTATION LINKS FOR MIXED REALITY ENVIRONMENTS

CROSS REFERENCE TO RELATED APPLICATIONS

This application claims the benefit and priority of U.S. Provisional Application No. 62/380,308 filed on Aug. 26, 2016 titled "Teleportation Links for Mixed Reality Environments," which is hereby incorporated by reference in entirety, including all references and appendices cited therein.

This application is related to U.S. Non-Provisional patent application Ser. No. 15/600,446 filed on May 19, 2017 titled "Media Tags—Location-Anchored Digital Media for Augmented Reality and Virtual Reality Environments," which is hereby incorporated by reference in entirety, including all references and appendices cited therein.

This application is related to U.S. Non-Provisional patent application Ser. No. 15/656,956 filed on Jul. 21, 2017 titled "Telelocation: Location Sharing for Users in Augmented and Virtual Reality Environments," which is hereby incorporated by reference in entirety, including all references and appendices cited therein.

FIELD OF INVENTION

Embodiments of the disclosure relate accessing digital data in augmented and virtual reality environments.

SUMMARY

Provided herein are exemplary methods for teleportation between two visual environments, including establishing a data structure for each visual environment, establishing logic for switching between each of the data structures, establishing an interactive graphical user interface communicatively coupled to each of the data structures and to the logic, and the interactive graphical user interface rendering a visual depiction of each of the visual environments.

Further exemplary methods include the data structure comprising any of an in-memory data structure, a data file, or remote data read over a network. Additionally, the establishing of the data structure may include defining an in-memory data structure to digitally store Teleportal information, creating a database wherein each row represents a Teleportal and each column represents information for the Teleportal.

According to various exemplary embodiments, the establishing of the logic for switching between each of the data structures includes naming a virtual reality environment and/or establishing a circular geofence. The establishing of the interactive graphical user interface may include displaying visual on-screen graphical elements representing Teleportals and/or linking visual elements to specific Teleportal data structures at runtime. The establishing of the interactive graphical user interface may also include handling user input events to lookup, read and consume information stored in a specific Teleportal data structure that is linked to a specific visual element that a user selects.

In many exemplary environments, one of the two visual environments may include an augmented reality visual environment and another one of the two visual environments may comprise a virtual reality visual environment. Alternatively, both of the two visual environments may include virtual reality environments.

In even further exemplary embodiments, one of the two visual environments may include an application visual environment and another one of the two visual environments may include a virtual reality visual environment, or one of the two visual environments may include an application visual environment and another one of the two visual environments may include an augmented reality environment. Exemplary methods also include switching from one of the two visual environments to another one of the two visual environments and switching back.

DESCRIPTION OF THE DRAWINGS

Certain embodiments of the present technology are illustrated by the accompanying figures. It will be understood that the figures are not necessarily to scale. It will be understood that the technology is not necessarily limited to the particular embodiments illustrated herein.

DETAILED DESCRIPTION

Digital devices running digital media software allow users to view and navigate through "virtual reality" or "VR" environments and can render virtual graphics on top of views of the real world as an "augmented reality" or "AR" environment.

Given these capabilities, what is needed is a mechanism ("Teleportal") to shift the user between environments, whether they be in the same reality or between mixed realities. A Teleportal is analogous to a hyperlink in that it specifies a digital location to go to. Whereas a hyperlink contains the information to take the user to a web page or network directory for example, a Teleportal contains the information to shift the user to another digital environment. Also, just as a hyperlink may be rendered in such a manner that the user can click on it to go to its destination or be used directly by software to access a location without user interaction, a Teleportal may also be rendered through a GUI allowing the user to interact with it to shift to a location or environment, or its information may be used directly by software to shift locations or environments without user interaction.

A mechanism for shifting users between environments using digital software is hereafter known as a "Teleportal." A Teleportal consists of the information necessary to describe a location or environment that digital media software should switch to. A Teleportal may be used by software executing on a digital device that needs the ability and information necessary to switch between environments or to different locations within the same environment. Such a device is capable of displaying real world environments, VR environments, and/or AR graphics.

A Teleportal is analogous to a hyperlink in that it provides the information necessary for digital media software to shift a user from one digital environment or location to another, and may be optionally rendered as part of a GUI in such a manner that the user can interact with it to manually invoke such a shift. For example, a GUI could be presented to the user of a smartphone who is viewing their real world surroundings using the smartphone's onboard camera. The GUI could contain icons, each of which corresponds to a different Teleportal stored in memory or on a remote server, where each Teleportal specifies a VR environment to switch to. Upon the user clicking an icon, the software reads information from the corresponding Teleportal. The software then performs the logic to load the data required to display the VR environment specified by that Teleportal.

Conversely, a software application may use the Teleportal's information to perform the switch based on some other logic without requiring direct user interaction. For example, consider the user who is viewing their real world surroundings through the onboard camera of their smartphone. The user walks to a certain real world location and a software application running on that smartphone could detect the user's location and then determine that the location corresponds to a Teleportal in some way. Using the information stored in that Teleportal, the software could then load up and display a VR environment to the user upon their arrival at the real world location.

For example, consider a user who views a house on their smartphone that is for sale. They could hold their smartphone up to the house which detects the house's address in some way (e.g. using location information). Software executing on that device then displays a GUI allowing the user to teleport to different rooms in that house. The software could use Teleportals in various ways to achieve this, such as, but not limited to, acquiring a Teleportal for each room from a remote real-estate server over a wireless computer network. The software might then display thumbnails of each room, and when the user clicks on one of them, the software teleports the user to a VR environment displaying the inside of the room they selected.

A Teleportal may contain any information required by the underlying digital media software to load and display the appropriate multimedia (e.g. graphic) data for the AR or VR environment, but does not usually contain that multimedia data itself. Digital media software should be programmed to understand and consume the information in a Teleportal and then load and display any required environmental data.

Information that may be contained within a Teleportal may include, but is not limited to:

Geocoordinate data such as latitude, longitude, altitude, and/or offsets from some frame of reference. Digital media software may use this information for many purposes such as, but not limited to, determining if a Teleportal's geolocation is within a geofence. A geofence is a virtual perimeter for a real-world geographic area. A geofence could be dynamically generated, as in a radius around a store or point location, or a geofence can be a predefined set of boundaries, like school attendance zones or neighborhood boundaries. The use of a geofence is called geofencing, and one example of usage involves a location-aware device of a location-based service user entering or exiting a geofence. This activity could trigger an alert to the device's user as well as messaging to the geofence operator.

Virtual world coordinates relative to an origin or some other frame of reference.

Contextual data, such as, but not limited to tag information that may be used by the digital media software in some way when consuming the Teleportal. One such example involves digital media software using the information so that it knows how to return back to a previous environment that the user had navigated to the present environment from.

A description of the Teleportal Link, such as, but not limited to describing what the Teleportal Link represents.

Multimedia or other data that may be used to visually represent the Teleportal in a GUI (e.g. a thumbnail image).

Scripts or other instructional information which further describe some aspect of an environment or location, or how to perform the shift.

For example, if a user who is viewing their real world surroundings through the smartphone's camera and then clicks a GUI element to teleport to a VR environment, the software running on the smartphone might then use the Teleportal associated with that GUI element to look up an appropriate Telelocation to download and display on the screen. The Teleportal could include information such as, but not limited to an identifier and description of the Telelocation that is to be loaded and displayed as part of the digital media software's GUI for selecting the Teleportal. For more information about Telelocations see U.S. Non-Provisional patent application Ser. No. 15/656,956 filed on Jul. 21, 2017 titled "Telelocation: Location Sharing for Users in Augmented and Virtual Reality Environments," which is hereby incorporated by reference in entirety, including all references and appendices cited therein.

A Teleportal may contain information describing how to return to a previous environment. Consider the example above of a user who has invoked a Teleportal through the GUI on their smartphone to display a VR environment. The Teleportal that was used by the software to determine which Telelocation to download and display, may contain or allow for the storage of information describing the environment that the user was in when the Teleportal was invoked. This information may have been pre-set in the Teleportal by the software's authors (e.g. stored in a data file and read by the software during startup), or may have been dynamically populated by the software at some point such as when the Teleportal was selected. Having such information in a Teleportal allows for "two-way" switching from one environment to another environment and back again, and may contain information such as, but not limited to: tags, enumerations, and/or identifiers indicating the type of or a specific environment to display and/or reload. Alternatively, the software may store the location to return to and simply provide an appropriate GUI that allows the user to return back.

Implementing a Teleportal may be done using any appropriate method where data can be stored and later retrieved such as, but not limited to: in-memory data structures, databases, data files, remote storage, etc.

Throughout this specification various terms are used and shall assume the following meanings and assumptions:

Augmented Reality ("AR"): a digital system or interface through which the user can view their surroundings with augmentations to that view. Any discussion of AR or related aspects of it refers to augmentation of a real world or "AR" environment. An AR platform creates a virtual graphics coordinate space that coincides with the real-world space around a user and renders computer graphics relative to that virtual graphics coordinate system such that those graphics appear to exist in the real world. An appropriate viewing device is also assumed for the user, such as but not limited to: a head-mounted display (e.g. augmented reality glasses or goggles) or a smartphone (i.e. acting as a viewing portal that displays computer graphics on top of, or blended with, a live video feed of the world as seen by camera hardware embedded in the device).

Virtual Reality ("VR"): a virtual reality platform creates a virtual graphics coordinate space into which computer graphic content is rendered in such a way that when viewed through a viewing device, all the user sees are computer graphics. No real world objects are seen in this environment. Appropriate viewing and interaction devices are also assumed for the user, such as, but not limited to: head-mounted displays, optionally with body or body-part motion tracking sensors and software, smartphones (i.e. acting as a viewing portal that displays computer graphics on top of, or blended with, a computer graphics environment background).

Mixed Reality: the ability of a digital device to display views of both the real world as well as digital graphics such that these graphics appear as if they were real world objects or locations, and may be optionally interacted with.

Visual Environment: digital content including, however not limited to, Augmented Reality, Virtual Reality, Mixed Reality, audio or any combination thereof.

Graphical User Interface ("GUI"): a graphical user interface that is rendered on a device and/or physical elements of a device that provides the user of a software application the ability to interact with the software.

Teleport: to switch between one environment or location to another. In the context of the various exemplary embodiments described in this document, teleport means to switch between one view on a digital device to another view, using stored digital data describing in part or in full, how to perform the switch. This "switch" is often referred to as a "shift" in this document.

Client Device: a device (e.g. a smartphone) that a user executes software programs on. Such a device is capable of executing some or all aspects of the invention described in this document.

Figure 1:
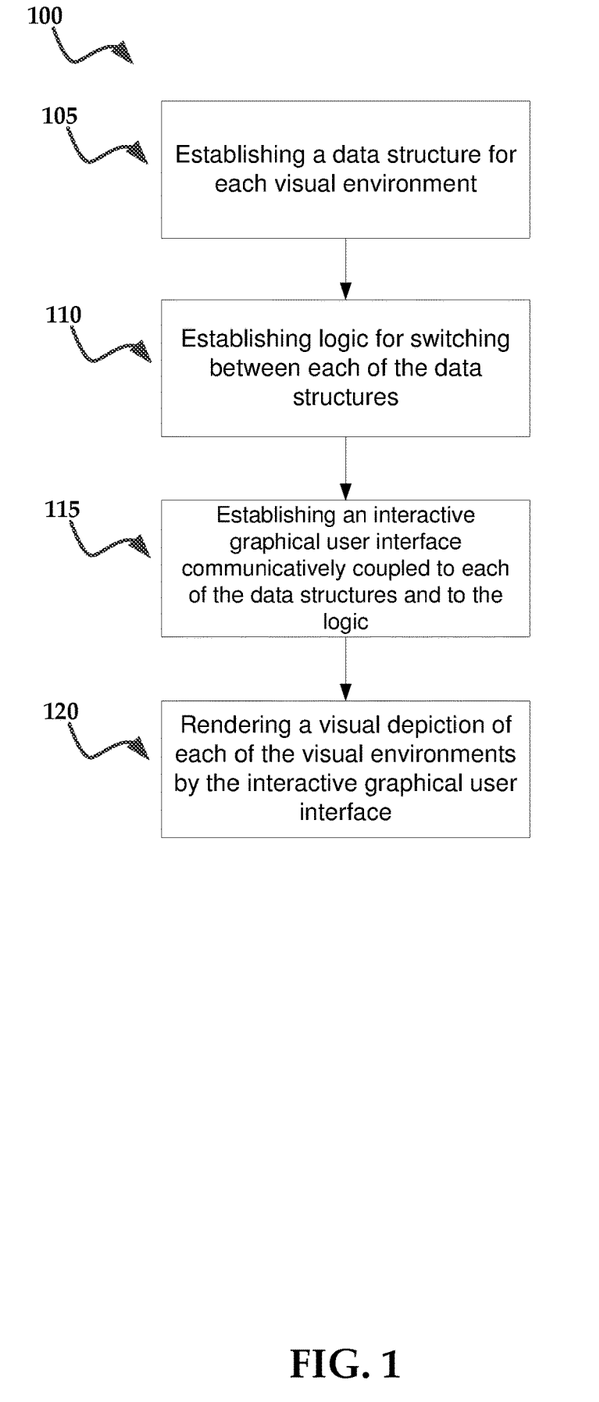
FIG. 1 is a flowchart of an exemplary method for constructing and consuming a Teleportal such that the Teleportal may be used to describe an environment to switch to, and can then be interpreted and consumed by software to execute this switch on a digital device.

FIG. 1 illustrates an exemplary process 100 for constructing and consuming a Teleportal such that the Teleportal may be used to describe an environment or location to shift to, and may then be interpreted and consumed by software to execute this shift on a digital device.

In sub process 105, logic is added to a software program to establish a Teleportal data structure containing information for a given environment that a user may shift to. This data structure may be in the form of, but is not limited to: in-memory data structures, data files, remote data read over a computer network, etc. The establishment of such a data structure in sub process 105 by a software program may involve, but is not limited to:

defining an in-memory data structure (e.g. a struct or class) to digitally store Teleportal information, instantiating the data structure in memory, populating the instance(s) with data, and adding logic to read and consume those data structures at will.

creating a database table whereby each row represents a Teleportal and each column contains the various pieces of information for each Teleportal. This could also include adding logic to read and consume the data from the table and storing it in memory for consumption. Such a database may be stored locally on the digital device, and/or read from a remote database server over a computer network.

creating a data file format that stores Teleportal information, reading that file, and storing this information in memory for consumption.

In sub process 110, a software program consumes and/or interprets the Teleportal information that was established in sub process 105. The software program then prepares the necessary data and/or performs the necessary logic to shift to the environment or location specified by that Teleportal's information. For example, a Teleportal may contain the name of a VR environment and the coordinates and size of a circular geofence. A software program may then periodically compare the Teleportal's geofence area to the user's current location, and upon the user entering that geofence, the software program may use the name of the VR environment to load a specific VR scene file from local storage that will be used to render the scene.

In sub process 115, a software program may optionally provide a GUI allowing users to interactively select and invoke a Teleportal such that the user can instigate the shift between environments or locations. Sub process 115 may involve, but is not limited to, a software program performing the following:

displaying visual on-screen text and/or graphical element(s) (e.g. thumbnails) which visually represent Teleportals.

linking the visual elements to specific Teleportal data structures at runtime.

handling user input events to lookup, read, and consume the information stored in a specific Teleportal data structure that is linked to a specific visual element that a user selects.

In sub process 120, the software program consumes a specific Teleportal that it or a user selected to teleport to. The software program loads all of the necessary data required to display the environment or location specified by that Teleportal. The software program uses any logic and data necessary to perform the shift from the current application or view within that application to a view or another software module capable of rendering the location or environmental data on screen. The user then sees this new location or environment on their client device.

Figure 2:
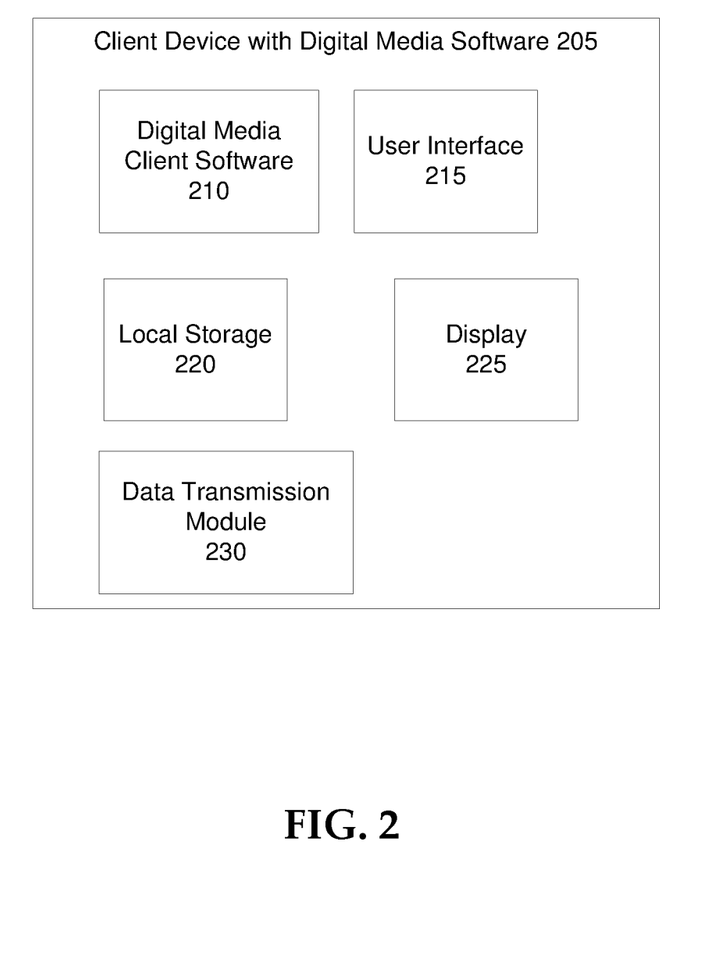
FIG. 2 is a block diagram of an exemplary client device for practicing aspects of the present technology.

FIG. 2 is a block diagram showing exemplary components which may be part of client device 205 allowing a user to view AR and VR digital content. This functionality may be provided on the client device 205 through digital media client software 210 installed or available on client device 205. Client device 205 may feature user interface 215 elements (e.g. touch screen controls, buttons, etc.) allowing the user to view and interact with digital content for an AR/VR environment. Client device 205 may also provide an appropriate display 225 (e.g. touch screen, VR goggles, etc.) allowing the user to view an AR/VR world as well as digital content that may have been placed in that world. The client device 205 may have or utilize local storage 220 for the purposes of caching any data necessary to view digital content as objects in the environment they are viewing. The client device 205 may communicate with other devices over data transmission module 230 for purposes such as, but not limited to acquiring the necessary data to teleport or to view an environment on display 225. Teleportals may be stored in local storage 220 and or acquired from another device over data transmission module 230.

Figure 3:
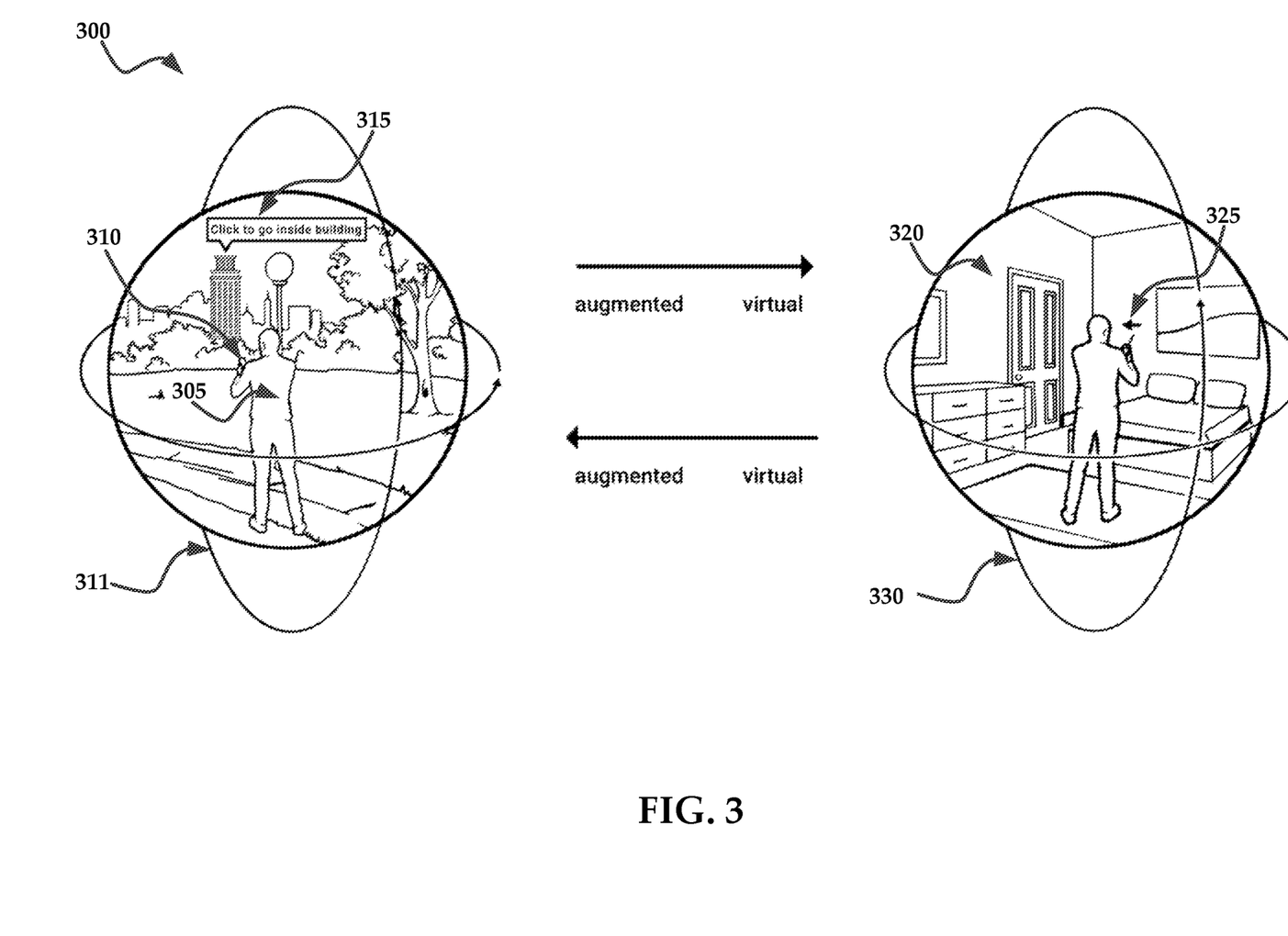
FIG. 3 provides an example depicting how a Teleportal may be used to shift a user from an AR environment to a VR environment and back.

FIG. 3 provides an example 300 depicting how a Teleportal may be used to shift a user from an AR environment to a VR environment. In example 300, a user 305 is viewing their real world surroundings through their smartphone 310 which is running digital media software that displays AR graphics 315 and is able to utilize Teleportals. The circles pointed at by nodes 311 and 330 show that the user may rotate the yaw, pitch, and/or roll of their device and/or view of their current environment along various axes.

AR graphic 315 provides a GUI that says "Click to go inside building" which the user may click on to see a VR view of the inside of a building. This graphic is linked to a Teleportal that the digital media software on device 310 can access. When the user clicks the GUI in AR graphic 315, the digital media software running on device 310 reads the location information stored in the Teleportal. The digital media software then loads up the multimedia data necessary to display the VR environment 320 on the screen of device 315. In example 300, the VR environment 320 contains a GUI that appears as an arrow 325 that when clicked on by the user, exits the VR environment and returns the user to the AR view of their current real world surroundings, thus showing that Teleportals may be used in bi-directional shifting of locations and environments. The digital media software on device 310 may utilize location data stored in the Teleportal that specifies where the user should be returned to, or may make this determination using some other method.

Figure 4A:
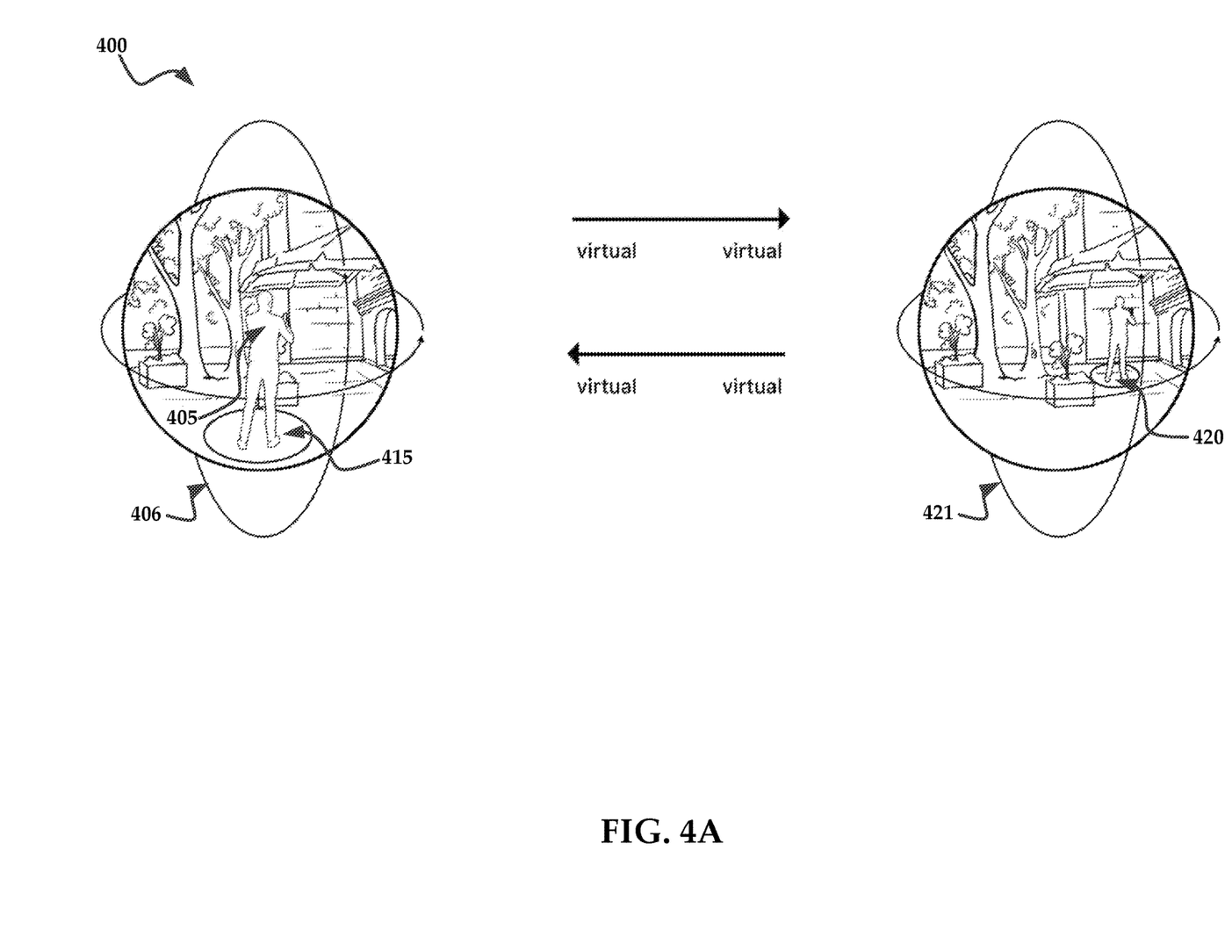
FIG. 4A provides an example depicting how a Teleportal may be used to shift a user from one location in a VR environment to another location.

FIG. 4A provides an example 400 depicting how a Teleportal may be used to shift a user from one location in a VR environment to another location. In example 400, the user's avatar 405 has navigated to a bounding area 415 in which the digital media software will teleport the user to another location within the current VR environment using information from a Teleportal associated with that bounding area. When the avatar 405 enters bounding area 415, the digital media software uses information stored in the Teleportal associated with bounding area 415 to determine where the avatar 405 should be relocated to. This information may include but is not limited to, the x, y, and z coordinates of the new virtual location 420. The avatar's position is then updated by the digital media software to the new location 420. The digital media software may also provide a mechanism such as, but not limited to a GUI or another bounding area, which allows the user to teleport back to location 415. The circles pointed at by nodes 406 and 421 show that the user may rotate the yaw, pitch, and/or roll of their device and/or view of their current environment along various axes.

Figure 4B:
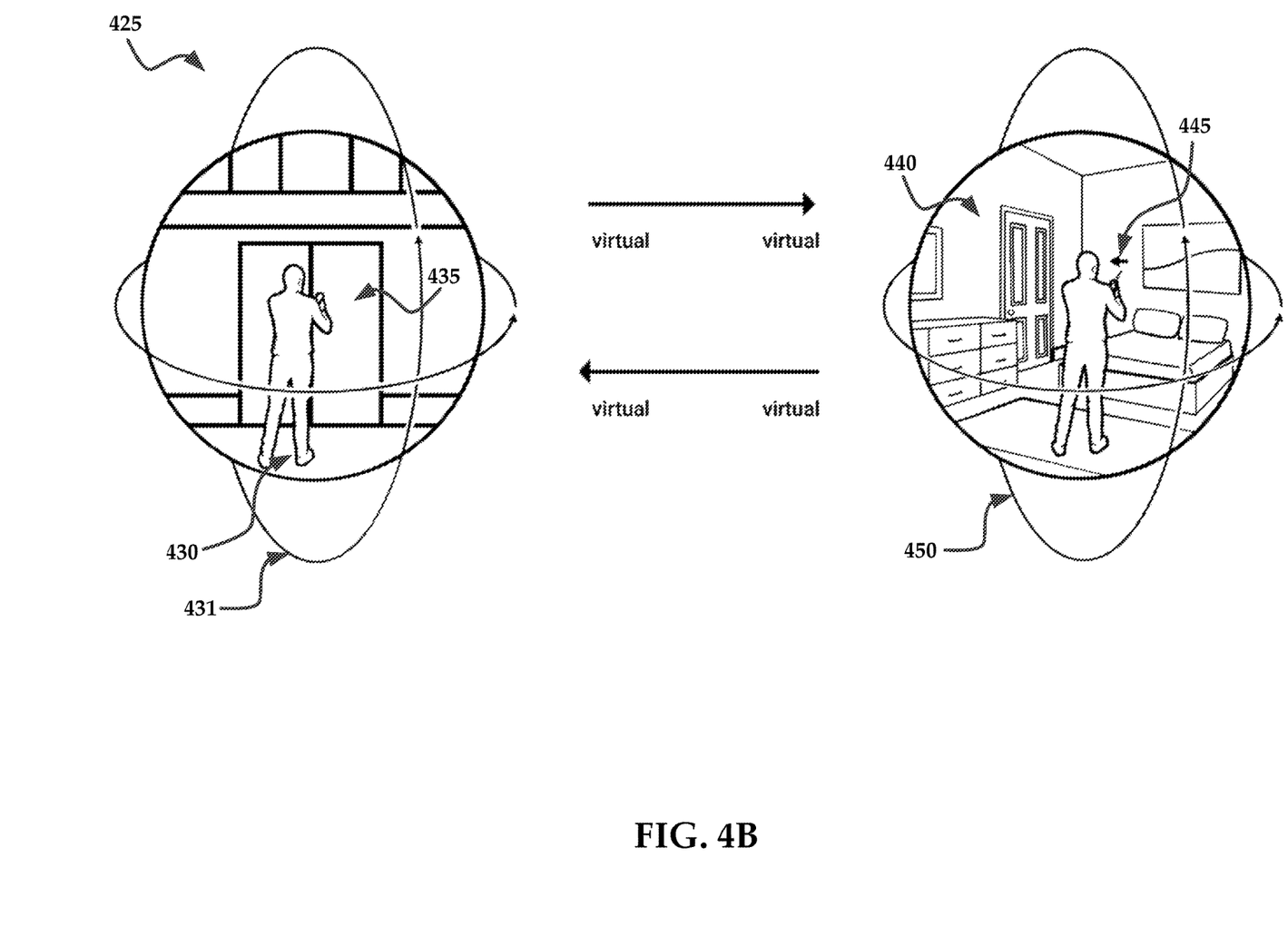
FIG. 4B provides an example depicting how a Teleportal may be used to shift a user from one VR environment to another VR environment and back again.

FIG. 4B provides an example 425 depicting how a Teleportal may be used to shift a user from one VR environment to another. In example 425, the user's avatar approaches the door 435 of a building which has a Teleportal associated with it. Upon approaching the door 435, the digital media software uses information stored in the Teleportal associated with the door 435 to determine that another VR environment representing the inside of the building 440 should be loaded and displayed to the user. The digital media software may also provide a mechanism such as, but not limited to, a GUI or another bounding area within the building's VR environment, which allows the user to teleport back to the location at the door 435 in the previous environment. In example 425, the GUI 445 consists of an arrow that the user can click to teleport back. When teleporting the user back, the digital media software may perform an appropriate action to render the original environment such as, but not limited to, reloading the original VR environment multimedia data and restoring the avatar's position to location 430. The circles pointed at by nodes 431 and 450 show that the user may rotate the yaw, pitch, and/or roll of their device and/or view of their current environment along various axes.

Figure 5:
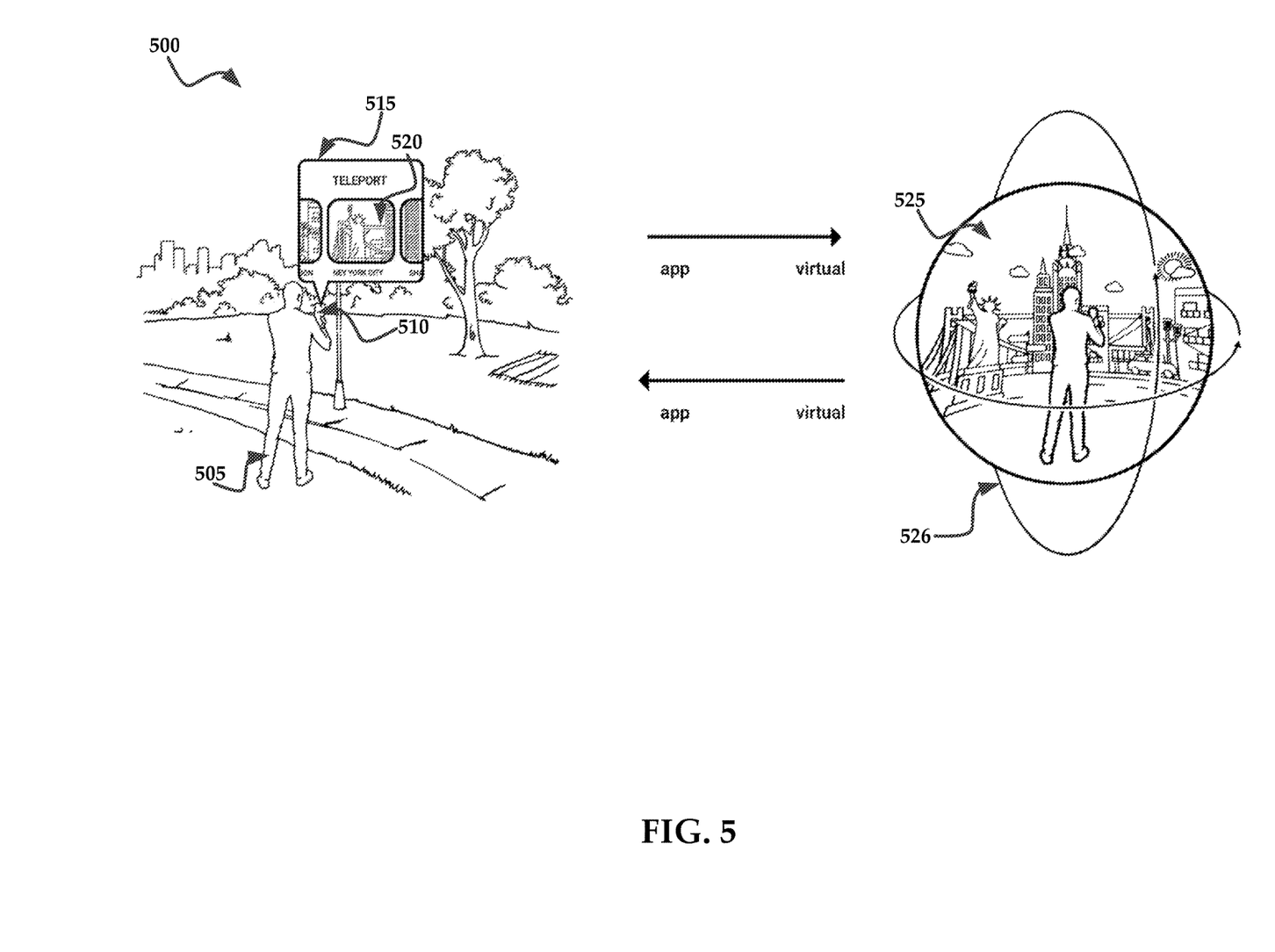
FIG. 5 provides an example depicting how a Teleportal may be used to shift a user from a non-environmental software application or view to a VR environment and back again.

FIG. 5 provides an example 500 depicting an "application-to-virtual" reality scenario. In example 500, a user 505 is interacting with a software application on their smartphone 510 that is not necessarily displaying an AR or VR environment but can understand and consume Teleportals. The software application provides a 2D GUI 515 displaying a number of thumbnails 520 representing locations around the world. Each thumbnail is associated with a Teleportal. When the user 505 clicks on one of these thumbnails 520, the software uses the information stored in the Teleportal associated with the thumbnail to display an immersive 3D virtual environment 525 such as, but not limited to, a photosphere or Telelocation. For more information about Telelocations see U.S. Non-Provisional patent application Ser. No. 15/656,956 filed on Jul. 21, 2017 titled "Telelocation: Location Sharing for Users in Augmented and Virtual Reality Environments," which is hereby incorporated by reference in entirety, including all references and appendices cited therein.

For example, the software may switch to a different mode capable of 3D rendering, or may load another software component with such capabilities. The software displaying the 3D immersive environment may provide an appropriate GUI allowing the user to exit out of the immersive 3D environment and return back to the 2D application or view, possibly using information in a Teleportal to complete this process.

The circle pointed at by node 526 shows that the user may rotate the yaw, pitch, and/or roll of their device and/or view of their current environment along various axes.

An aspect of example 500 is that a Teleportal may be used to switch between a non-environmental software application or view within a software application and a virtual 3D environment and back again. A non-environmental software application or view within a software application is one which is not currently displaying or is not capable of displaying AR or VR graphics. Furthermore, this highlights that a Teleportal is a generic entity which is independent of the type of software in which it is being used, and thus any type of software is free to consume, act on, and optionally display a Teleportal in any way it chooses.

Examples of software applications or views that may not necessarily display AR or VR graphics or environments but could interpret and consume Teleportals include, but are not limited to:

HTML-based applications such as pages displayed in web browsers which can render Teleportals as hyperlinks. The user may then click such a hyperlink to display the location as a 3D immersive environment.

Graphical multimedia applications which render 2D GUIs of Teleportals as thumbnails or other on-screen iconic elements, where by the visual(s) of such element(s) provide a clue as to the location that the user may navigate to. The user can then click the element to display the location as a 3D immersive environment.

Figure 6:
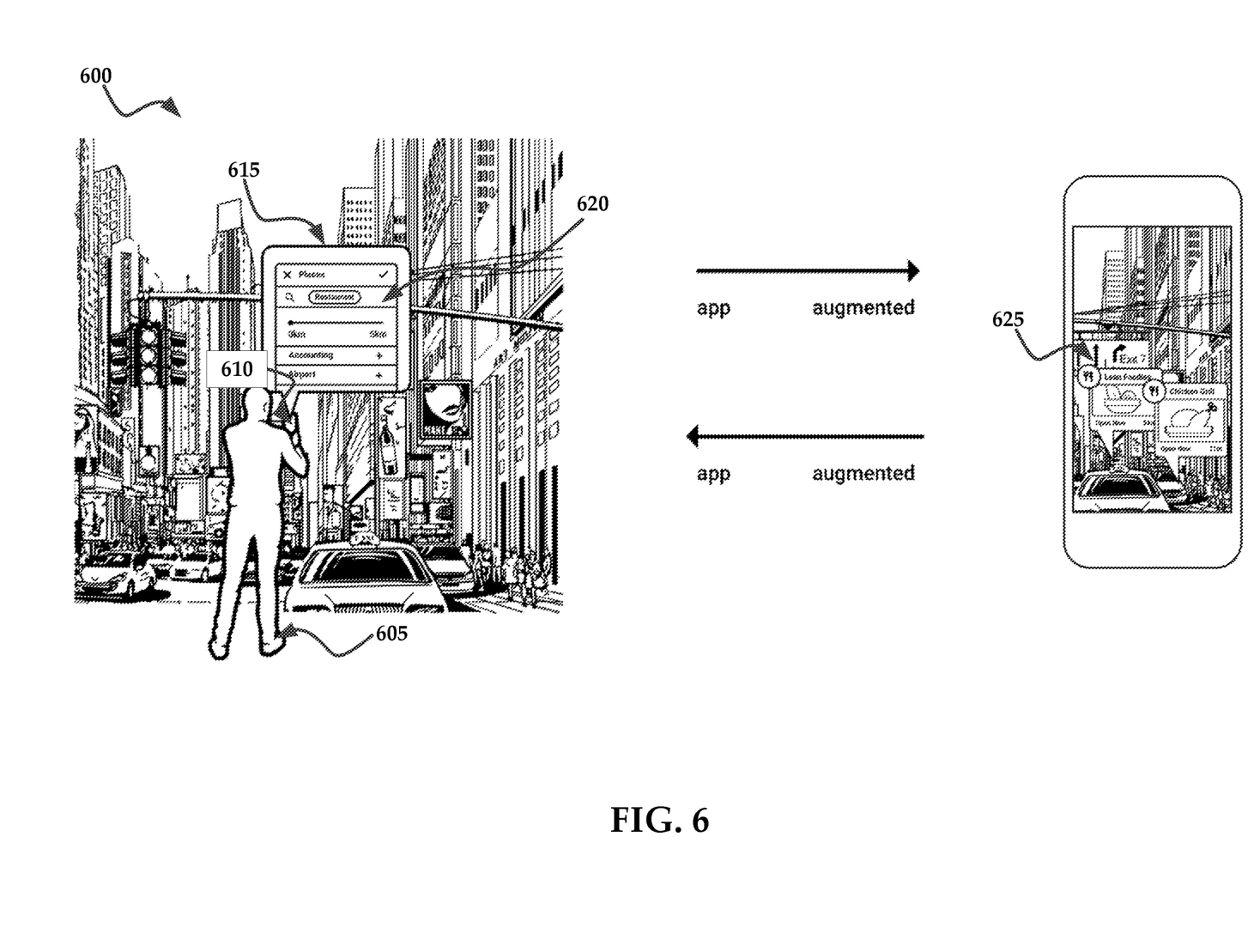
FIG. 6 provides an example depicting how a Teleportal may be used to shift a user from a non-environmental software application or view to an AR environment and back again.

FIG. 6 provides an example 600 depicting an "application-to-augmented" reality scenario. In example 600, a user 605 is interacting with a software application on their smartphone 610 that is not displaying an AR or VR environment but can store and consume Teleportals. The software application provides a 2D GUI 615 displaying a number of menu items 620 representing various AR graphics. Each menu item is associated with a Teleportal. When the user 605 clicks on one of these menu items 620, the software uses the information stored in the Teleportal associated with that menu item to display AR graphics 625 (e.g. Media Tags) overlaid on a camera view of the user's current surroundings that are being captured using the smartphone's 610 camera. For more information about Media Tags see U.S. Non-Provisional patent application Ser. No. 15/600,446 filed on May 19, 2017 titled "Media Tags—Location-Anchored Digital Media for Augmented Reality and Virtual Reality Environments," which is hereby incorporated by reference in entirety, including all references and appendices cited therein.

For example, upon clicking the menu item, the software may switch to a mode or invoke another software module that displays the surroundings using the camera, and then renders AR graphics on top of that camera view. The software displaying the AR graphics may provide an appropriate GUI allowing the user to exit and return back to the 2D application or non-environmental view, possibly using information stored in a Teleportal to complete this process.

Similar to example 500, example 600 illustrates that a Teleportal may be used to switch between a non-environmental software application or view and an AR environment.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the description, for purposes of explanation and not limitation, specific details are set forth, such as particular embodiments, procedures, techniques, etc. in order to provide a thorough understanding of the various exemplary embodiments. However, it will be apparent to one skilled in the art that various exemplary embodiments may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present. The description herein is illustrative and not restrictive. Many variations of the technology will become apparent to those of skill in the art upon review of this disclosure.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method for teleportation between two visual environments, the method comprising:
    establishing a data structure for each visual environment;
    establishing logic for switching between each of the data structures;
    establishing an interactive graphical user interface communicatively coupled to each of the data structures and to the logic, the interactive graphical user interface rendering a visual depiction of each of the visual environments; the method further comprising one of the two visual environments including an augmented reality visual environment and another one of the two visual environments comprising a virtual reality visual environment;
    and wherein establishing the interactive graphical user interface further includes rendering visual on-screen elements representing Teleportals in the visual depiction;
    and wherein the establishing of the logic for switching between each of the data structures includes establishing a geofence perimeter.

2. The method of claim 1, the data structure comprising any of an in-memory data structure, a data file, or remote data read over a network.

3. The method of claim 1, the establishing of the data structure further comprising defining an in-memory data structure to digitally store Teleportal information.

4. The method of claim 1, the establishing of the data structure further comprising creating a database wherein each row represents a Teleportal and each column represents information for the Teleportal.

5. The method of claim 1, the establishing of the logic for switching between each of the data structures including naming a virtual reality environment.

6. The method of claim 1, wherein the geofence is a circular geofence.

7. The method of claim 1, the establishing of the interactive graphical user interface including displaying visual on-screen graphical elements representing Teleportals.

8. The method of claim 1, the establishing of the interactive graphical user interface including linking visual elements to specific Teleportal data structures at runtime.

9. The method of claim 1, the establishing of the interactive graphical user interface including handling user input events to lookup, read and consume information stored in a specific Teleportal data structure that is linked to a specific visual element that a user selects.

10. The method of claim 1, further comprising switching from one of the two visual environments to another one of the two visual environments.

11. The method of claim 10, further comprising switching back.

12. The method of claim 1, further comprising switching from the augmented reality visual environment to the virtual reality visual environment in accordance with a real world Teleportal geolocation.

13. A computer program product for teleportation between two visual environments, the computer program product stored on a non-transitory computer-readable medium and including instructions configured to cause a processor to execute steps comprising:
    establishing a data structure for each visual environment;
    establishing logic for switching between each of the data structures;
    establishing an interactive graphical user interface communicatively coupled to each of the data structures and to the logic, the interactive graphical user interface rendering a visual depiction of each of the visual environments; the method further comprising one of the two visual environments including an augmented reality visual environment and another one of the two visual environments comprising a virtual reality visual environment;
    and wherein establishing the interactive graphical user interface further includes rendering visual on-screen elements representing Teleportals in the visual depiction;
    and wherein the establishing of the logic for switching between each of the data structures includes establishing a geofence perimeter.

14. The computer program product of claim 13, wherein the data structure comprises any of an in-memory data structure, a data file, or remote data read over a network.

15. The computer program product of claim 13, wherein the establishing of the data structure further comprises defining an in-memory data structure to digitally store Teleportal information.

16. The computer program product of claim 13, wherein the establishing of the data structure further comprises creating a database wherein each row represents a Teleportal and each column represents information for the Teleportal.

17. The computer program product of claim 13, wherein the establishing of the logic for switching between each of the data structures includes naming a virtual reality environment.

18. The computer program product of claim 13, wherein wherein the geofence is a circular geofence.

19. The computer program product of claim 13, wherein the establishing of the interactive graphical user interface includes displaying visual on-screen graphical elements representing Teleportals.

20. The computer program product of claim 13, wherein the establishing of the interactive graphical user interface includes linking visual elements to specific Teleportal data structures at runtime.

\* \* \* \* \*